US008626431B2

(12) United States Patent
Okita

(10) Patent No.: US 8,626,431 B2
(45) Date of Patent: Jan. 7, 2014

(54) TRAVEL SUPPORTING CONTROL SYSTEM

(75) Inventor: Toshinori Okita, Susono (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 336 days.

(21) Appl. No.: 12/920,568

(22) PCT Filed: Jul. 9, 2009

(86) PCT No.: PCT/JP2009/062520
§ 371 (c)(1),
(2), (4) Date: Sep. 1, 2010

(87) PCT Pub. No.: WO2010/005049
PCT Pub. Date: Jan. 14, 2010

(65) Prior Publication Data
US 2011/0022317 A1 Jan. 27, 2011

(30) Foreign Application Priority Data
Jul. 11, 2008 (JP) ................. 2008-181869

(51) Int. Cl.
*B60W 30/18* (2012.01)
*B60W 30/09* (2012.01)
*B60W 30/12* (2006.01)
*B60W 40/02* (2006.01)
*B62D 15/02* (2006.01)

(52) U.S. Cl.
CPC ............ *B60W 30/09* (2013.01); *B60W 30/12* (2013.01); *B60W 40/02* (2013.01); *B62D 15/025* (2013.01)
USPC ........................................................ 701/301

(58) Field of Classification Search
None
See application file for complete search history.

(56) References Cited

U.S. PATENT DOCUMENTS 6,026,347 A * 2/2000 Schuster .................. 701/301
6,487,501 B1 * 11/2002 Jeon ........................ 701/301
(Continued)

FOREIGN PATENT DOCUMENTS

JP 09-128687 A 5/1997
JP 10-203394 A 8/1998
(Continued)

OTHER PUBLICATIONS

Brandt et al., "Combining haptic human-machine interaction with predictive path planning for lane-keeping and collision avoidance systems", 2007 IEEE Intelligent Vehicles Symposium, Jun. 2007, pp. 582-587.*

(Continued)

*Primary Examiner* — James Trammell
*Assistant Examiner* — Todd Melton
(74) *Attorney, Agent, or Firm* — Sughrue Mion, PLLC

(57) ABSTRACT

In a travel supporting control system 10 including an LDW/LKA system 17 which performs traveling-lane keeping assist control so that a vehicle V travels without deviating from the lane along which it travels, the LDW/LKA system 17 calculates a virtual lane width W, which is the width of the lane narrowed by an obstacle O detected by an obstacle detecting sensor 11, and stops the traveling-lane keeping assist control when the calculated virtual lane width W is so narrow as to be equal to or smaller than a threshold value and an avoidance operation of the driver is required. Accordingly, since the operation of LDW or LKA can be stopped at a proper timing, it becomes possible to prevent interference between the operation of the driver and the operation of the system for keeping the lane.

5 Claims, 15 Drawing Sheets

(56) References Cited

U.S. PATENT DOCUMENTS

| | | | |
|---|---|---|---|
| 6,675,094 B2* | 1/2004 | Russell et al. | 701/301 |
| 6,926,374 B2* | 8/2005 | Dudeck et al. | 303/191 |
| 7,349,767 B2* | 3/2008 | Kuge et al. | 701/1 |
| 7,890,231 B2* | 2/2011 | Saito et al. | 701/41 |
| 8,090,537 B2* | 1/2012 | Nishira et al. | 701/301 |
| 8,150,583 B2* | 4/2012 | Danner et al. | 701/45 |
| 2005/0267683 A1* | 12/2005 | Fujiwara et al. | 701/301 |
| 2009/0299573 A1* | 12/2009 | Thrun et al. | 701/41 |
| 2010/0191421 A1* | 7/2010 | Nilsson | 701/41 |

FOREIGN PATENT DOCUMENTS

| | | |
|---|---|---|
| JP | 2003-146163 A | 5/2003 |
| JP | 2004-078333 A | 3/2004 |
| JP | 2004-199286 A | 7/2004 |
| JP | 2005-516295 A | 6/2005 |
| JP | 2005-310011 A | 11/2005 |
| JP | 2005-324782 A | 11/2005 |
| JP | 2007-253745 A | 10/2007 |
| JP | 2008-143263 A | 6/2008 |
| JP | 2009-012602 A | 1/2009 |

OTHER PUBLICATIONS

Chen et al., "Coordination of the authority between the vehicle driver and a steering assist controller", World Scientific and Engineering Academy and Society Transactions on Systems and Control, May 2008, pp. 353-364.*

Liu et al., "Development of an interactive lane keeping control system for vehicle," IEEE Vehicle Power and Propulsion Conference 2007, Sep. 2007, pp. 702-706.*

English-language translation of the International Search Report for International Application No. PCT/JP2009/062520, dated Oct. 20, 2009.

Office Action for corresponding Japanese Patent Application No. 2008-181869, dated Oct. 13, 2009.

Office Action for corresponding Japanese Patent Application No. 2008-181869, dated Jul. 6, 2010.

Translation of the International Preliminary Report on Patentability for corresponding International Patent Application No. PCT/JP2009/062520 mailed Mar. 24, 2011.

* cited by examiner

TRAVEL SUPPORTING CONTROL SYSTEM

CROSS REFERENCE TO RELATED APPLICATIONS

This application is a National Stage of International Application No. PCT/JP2009/062520 filed on Jul. 9, 2009, which claims priority from Japanese Patent Application No. 2008-181869, filed on Jul. 11, 2008, the contents of all of which are incorporated herein by reference in their entirety.

TECHNICAL FIELD

The present invention relates to a travel supporting control system and in particular, to a travel supporting control system which supports driving of a driver of a vehicle or controls traveling of the vehicle so that the vehicle travels without deviating from the lane along which it travels.

BACKGROUND ART

A system has been proposed which performs support of driving of a driver or control of traveling of a vehicle, such as lane departure warning (LDW) or lane keeping assist (LKA), so that the vehicle travels without deviating from the lane along which it travels. For example, Patent Literature 1 discloses a lane departure control device which detects a parked vehicle in front of its own vehicle, sets a virtual line by changing an actual lane which is a threshold value for control of departure prevention on the basis of the detected parked vehicle, and performs control for lane departure prevention on the basis of the virtual line when the vehicle tends to deviate from the lane, so that the control for lane departure prevention can be optimally performed in consideration of a front obstacle, such as a parked vehicle.

Citation List

Patent Literature

PTL 1: Japanese Unexamined Patent Application Publication No. 2005-324782

SUMMARY OF INVENTION

Technical Problem

In the above technique, however, if a driver performs a driving operation of avoiding the obstacle in front of the vehicle without stopping the operation of LDW or LKA, the operation of LDW or LKA for keeping the lane and the driving operation of the driver may interfere with each other.

That is, if an obstacle exists in front of the vehicle during the operation of LDW or LKA, an avoidance operation by course changing is required. Usually, the driver performs an avoidance operation after performing a blinker operation for course changing. Accordingly, the driver performs the avoidance operation (course changing) after the operation of LDW or LKA is stopped by the blinker operation. However, when the detection of an obstacle is late, the operation of LDW or LKA is not stopped by the blinker operation or the like.

Accordingly, since steering power is generated in a direction against the avoidance operation by LDW or LKA, the steering power may interfere with the operation of the driver.

Currently, as a method of stopping the operation of LDW or LKA in order to avoid an obstacle, a driver should perform a blinker operation or set an operation switch of LDW or LKA to OFF. Interference by the operation of LDW or LKA cannot be completely prevented even if the operation of LDW or LKA is stopped when the driver steers with steering power equal to or more than a threshold value. For this reason, unless a driver performs a switch operation, interference between the operation of the driver and the operation of LDW or LKA occurs. Therefore, there is a demand for stopping the operation of LDW or LKA at a proper timing even if the driver does not perform a switch operation.

The present invention has been made in view of the situation, and it is an object of the present invention to provide a travel supporting control system capable of preventing interference between the operation of a driver and the operation of a system for keeping the lane.

Solution to Problem

The present invention is a travel supporting control system including: a traveling-lane keeping assist control unit that performs traveling-lane keeping assist control, which is either assistance of driving of a driver of a vehicle or control of traveling of the vehicle, so that the vehicle travels without deviating from a lane along which the vehicle travels; an obstacle detecting unit that detects an obstacle in front of the vehicle; a virtual lane width calculating unit that calculates a virtual lane width which is a width of the lane narrowed by the obstacle detected by the obstacle detecting unit; and a traveling-lane keeping control stopping unit that stops the traveling-lane keeping assist control performed by the traveling-lane keeping control unit when the virtual lane width calculated by the virtual lane width calculating unit is equal to or smaller than a threshold value.

According to this configuration, in the travel supporting control system including the traveling-lane keeping assist control unit that performs traveling-lane keeping assist control so that the vehicle travels without deviating from the lane along which it travels, the virtual lane width calculating unit calculates the virtual lane width, which is the width of the lane narrowed by the obstacle detected by the obstacle detecting unit, and the traveling-lane keeping control stopping unit stops the traveling-lane keeping assist control performed by the traveling-lane keeping control unit when the virtual lane width calculated by the virtual lane width calculating unit is so narrow as to be equal to or smaller than the threshold value and the avoidance operation of the driver is required. Accordingly, since the operation of LDW or LKA can be stopped at a proper timing, it becomes possible to prevent interference between the operation of the driver and the operation of the system for keeping the lane.

In this case, it is preferable to further include a virtual lane setting unit that sets a virtual lane which is a region where the vehicle travels in the lane narrowed by the obstacle detected by the obstacle detecting unit, and it is preferable that the virtual lane width calculating unit calculates a width of the virtual lane set by the virtual lane setting unit as the virtual lane width.

According to this configuration, the virtual lane setting unit sets a virtual lane, which is a region where the vehicle travels in the lane narrowed by the obstacle detected by the obstacle detecting unit, and the virtual lane width calculating unit calculates the width of the virtual lane set by the virtual lane setting unit as the virtual lane width. Accordingly, it is possible to stop the operation of LDW or LKA at an ideal timing according to the width of the region where the vehicle travels.

In this case, it is preferable to further include: a driver intention detecting unit capable of detecting a direction, in which the driver is going to make the vehicle travel, on the basis of an operation of the driver of the vehicle; and a virtual lane selecting unit that, when the virtual lane setting unit sets a plurality of virtual lanes divided in the width direction of the virtual lane by the obstacle detected by the obstacle detecting unit, selects the virtual lane in the direction in which the driver is going to make the vehicle travel, which is detected by the driver intention detecting unit, from the plurality of divided virtual lanes. Moreover, it is preferable that the traveling-lane keeping control stopping unit stops the traveling-lane keeping assist control performed by the traveling-lane keeping control unit when the virtual lane width of the virtual lane selected by the virtual lane selecting unit is equal to or smaller than the threshold value.

According to this configuration, the traveling-lane keeping control stopping unit stops the traveling-lane keeping assist control when the virtual lane width of the virtual lane in the direction in which the driver is going to make the vehicle travel, which is detected by the driver intention detecting unit, among the plurality of divided virtual lanes is equal to or smaller than the threshold value. Accordingly, even when a lane which stops the operation of LDW or LKA and a lane which does not stop the operation of LDW or LKA are mixed on the road, it becomes possible to prevent interference between the operation of the driver and the operation of the system for keeping the lane.

In addition, preferably, the traveling-lane keeping assist control unit performs the traveling-lane keeping assist control so that the vehicle travels without deviating from the virtual lane until the vehicle arrives at the location where the virtual lane width becomes equal to or smaller than the threshold value in the virtual lane, and the traveling-lane keeping control stopping unit stops the traveling-lane keeping assist control performed by the traveling-lane keeping control unit when the vehicle arrives at the location where the virtual lane width becomes equal to or smaller than the threshold value in the virtual lane.

According to this configuration, the traveling-lane keeping assist control is performed so that the vehicle travels without deviating from the virtual lane until the vehicle arrives at the location where the virtual lane width becomes equal to or smaller than the threshold value in the virtual lane, and the traveling-lane keeping assist control is stopped when the vehicle arrives at the location where the virtual lane width becomes equal to or smaller than the threshold value in the virtual lane. Accordingly, even in a virtual lane narrowed by the obstacle, it is possible to operate LDW or LKA until the vehicle arrives at the location where the virtual lane width becomes equal to or smaller than the threshold value and stop the operation of LDW or LKA at a proper timing.

Alternatively, it is preferable that when the driver intention detecting unit does not detect a direction in which the driver is going to make the vehicle travel, the traveling-lane keeping control stopping unit stops the traveling-lane keeping assist control performed by the traveling-lane keeping control unit when one of the plurality of divided virtual lanes is equal to or smaller than the threshold value.

According to this configuration, if a driver does not determine the direction in which the driver is going to make the vehicle travel, the traveling-lane keeping assist control is stopped when one of the plurality of divided virtual lanes becomes equal to or smaller than a threshold value. Accordingly, when a driver's intention is not determined, the traveling-lane keeping assist control is stopped early. As a result, it becomes possible to prevent interference between the operation of the driver and the operation of the system for keeping the lane when the driver's intention is determined.

Advantageous Effects of Invention

According to the travel supporting control system of the present invention, it becomes possible to prevent interference between the operation of a driver and the operation of a system for keeping the lane.

BRIEF DESCRIPTION OF DRAWINGS

FIG. 1 is a block diagram showing a travel supporting control system according to an embodiment.

FIG. 2 is a plan view showing the situation of a road to which the travel supporting control system according to the embodiment is applied.

FIG. 3 is a flow chart showing the overall operation of the travel supporting control system according to the embodiment.

FIG. 4 is flow chart showing the details of the operation of the travel supporting control system according to the embodiment.

FIGS. 5A to 5D are plan views showing an example when course changing is required for obstacle avoidance.

FIGS. 6A to 6D are plan views showing an example when course changing is not necessary for obstacle avoidance.

FIG. 7 is a graph showing the distribution of timing of a normal avoidance operation of a driver against an obstacle.

FIG. 8 is a graph showing the relationship between the relative speed with respect to an obstacle and T, which is a normal avoidance timing, when the overlapping rate is 50% in a state where the obstacle is stopped.

FIG. 9 is a graph showing the relationship between the relative speed with respect to an obstacle and T, which is a normal avoidance timing, when the overlapping rate is 100% in a state where the obstacle is stopped.

FIG. 10 is a graph showing the relationship between the relative speed with respect to an obstacle and T, which is a normal avoidance timing, when the overlapping rate is 50% in a state where the speed of the obstacle is 30 km/h.

FIG. 11 is a graph showing the relationship between the relative speed with respect to an obstacle and T, which is a normal avoidance timing, when the overlapping rate is 100% in a state where the speed of the obstacle is 30 km/h.

FIG. 12 is a plan view showing the situation of a road to which the travel supporting control system according to the embodiment is applied, and is a view showing a method of setting a virtual white line which is different from that in FIG. 2.

FIG. 13 is a plan view showing the situation of a road to which the travel supporting control system according to the embodiment is applied.

FIG. 14 is a flow chart showing the overall operation of the travel supporting control system according to the embodiment.

FIG. 15 is a plan view showing the situation of a road to which the travel supporting control system according to the embodiment is applied, and is a view showing a method of setting a virtual white line which is different from that in FIG. 13.

DESCRIPTION OF EMBODIMENTS

Hereinafter, embodiments of the present invention will be described with reference to the accompanying drawings.

Figure 1:
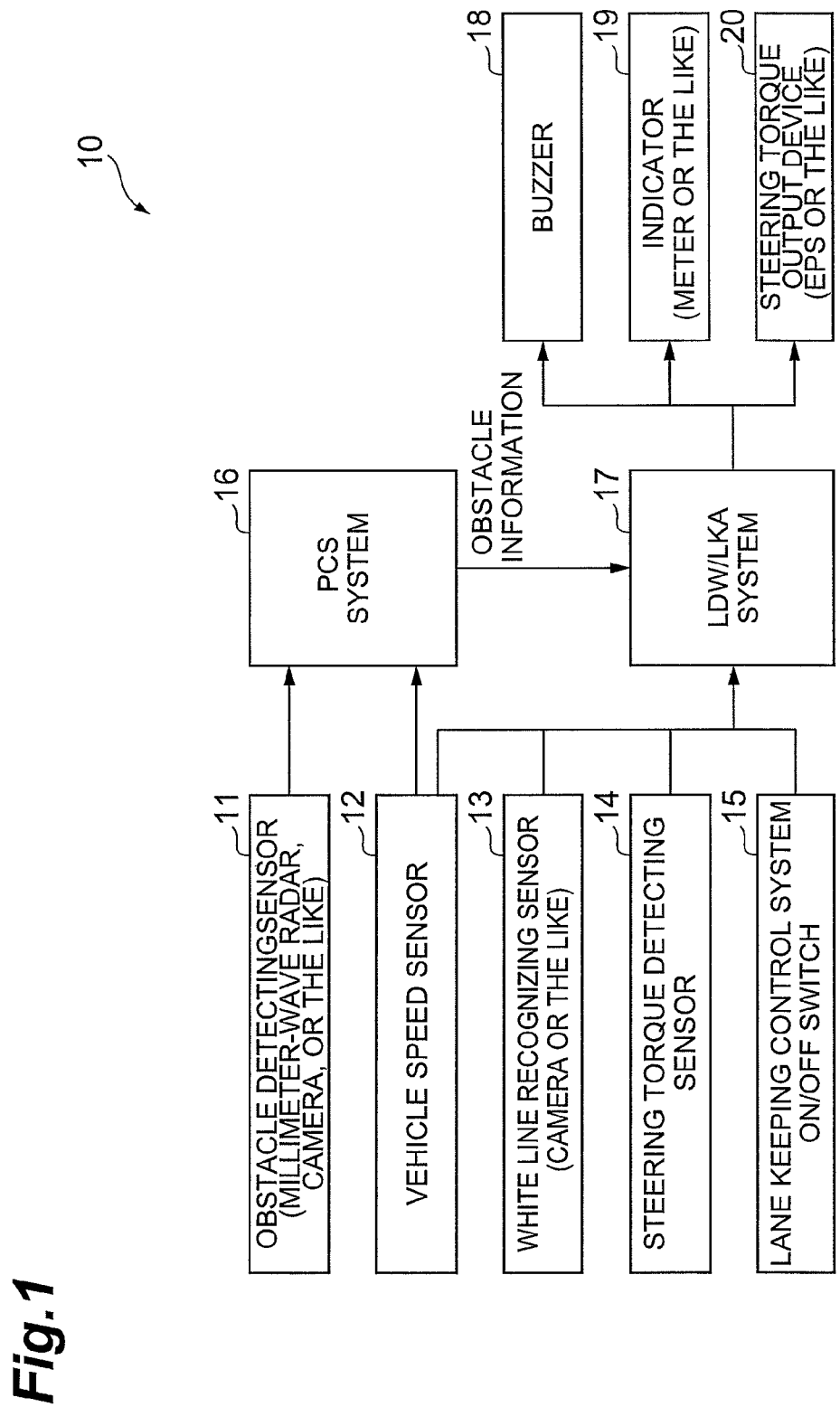
[FIG. 1]

A travel supporting control system 10 of the present embodiment is mounted in a vehicle to perform travel supporting, such as LDW or LKA. As shown in FIG. 1, the travel supporting control system 10 of the present embodiment includes an obstacle detecting sensor 11, a vehicle speed sensor 12, a white line recognizing sensor 13, a steering torque detecting sensor 14, a lane keeping system ON/OFF switch 15, a PCS (Pre-Crash Safety) system 16, an LDW/LKA system 17, a buzzer 18, an indicator 19, and a steering torque output device 20.

The obstacle detecting sensor 11 is for detecting an obstacle in front of a vehicle like a millimeter-wave radar, a stereo camera, and a sonar. The obstacle detecting sensor 11 functions as an obstacle detecting unit described in the appended claims.

The vehicle speed sensor 12 is provided at an axle of the vehicle in order to detect the vehicle speed of the vehicle by measuring the number of revolutions of the axle.

The white line recognizing sensor 13 is for recognizing a white line on the road, which divides the lane along which the vehicle travels, by a camera or the like in order to recognize the boundary of the lane.

The steering torque detecting sensor 14 is for detecting the torque of steering by a driver, outputting it to the LDW/LKA system 17, and stopping the operation of the LDW/LKA system 17 according to the steering torque.

The lane keeping system ON/OFF switch 15 is for operating and stopping the LDW/LKA system 17 by operation of a driver.

The PCS system 16 is a system which determines the possibility of collision between the vehicle and an obstacle beforehand from detection results of the obstacle detecting sensor 11 and the vehicle speed sensor 12 in order to avoid the collision or reduce the damage caused by the collision. The PCS system 16 outputs to the LDW/LKA system 17 the obstacle information including the detection result regarding the possibility of collision of the vehicle and the obstacle and the detection results of the obstacle detecting sensor 11 and the vehicle speed sensor 12.

The LDW/LKA system 17 supports driving of the driver of the vehicle and controls traveling of the vehicle so that the vehicle travels without deviating from the lane, along which it travels, on the basis of the information from the vehicle speed sensor 12 and the white line recognizing sensor 13. The LDW/LKA system 17 functions as a traveling-lane keeping assist control unit described in the appended claims.

In addition, the LDW/LKA system 17 sets a virtual lane, which is a region where the vehicle travels, in the lane narrowed by an obstacle in front of the vehicle, from detection signals from the vehicle speed sensor 12, the white line recognizing sensor 13, and the steering torque detecting sensor 14 and the obstacle information from the PCS system 16. The LDW/LKA system 17 functions as a virtual lane setting unit described in the appended claims. In addition, the LDW/LKA system 17 calculates the virtual lane width which is a width of the set virtual lane. The LDW/LKA system 17 functions as a virtual lane width calculating unit described in the appended claims. In addition, the LDW/LKA system 17 stops the support of driving of the driver of the vehicle and the control of traveling of the vehicle called LDW and LKA for making the vehicle travel without deviating from the lane, along which it travels, when the calculated virtual lane width is equal to or smaller than a threshold value. The LDW/LKA system 17 functions as a lane keeping control stopping unit described in the appended claims.

In addition, the LDW/LKA system 17 detects a direction, in which the driver is going to make the vehicle travel, on the basis of the steering torque according to the steering operation of the driver of the vehicle which is detected by the steering torque detecting sensor 14. The LDW/LKA system 17 functions as a driver intention detecting unit described in the appended claims.

In addition, when setting a plurality of virtual lanes divided in the width direction of the virtual lane by the obstacle detected by the obstacle detecting sensor 11, the LDW/LKA system 17 selects a virtual lane in the direction in which the driver is going to make the vehicle travel, which is assumed on the basis of the steering torque detected by the steering torque detecting sensor 14, from the plurality of divided virtual lanes. The LDW/LKA system 17 functions as a virtual lane selecting unit described in the appended claims.

The buzzer 18 is for making a warning sound for the driver when there is a possibility that the vehicle will deviate from the lane or the like. The indicator 19 is a liquid crystal display, a meter, or the like, specifically, and is for displaying ON.OFF of LDW and LKA by the LDW/LKA system 17 and the virtual lane width, which is calculated by the LDW/LKA system 17, for the driver. The steering torque output device 20 is an EPS (electric power Steering) or the like, specifically, and is for generating the steering torque for returning the vehicle to the lane when the vehicle is going to deviate from the lane according to ON.OFF of LDW and LKA by the LDW/LKA system 17.

Figure 2:
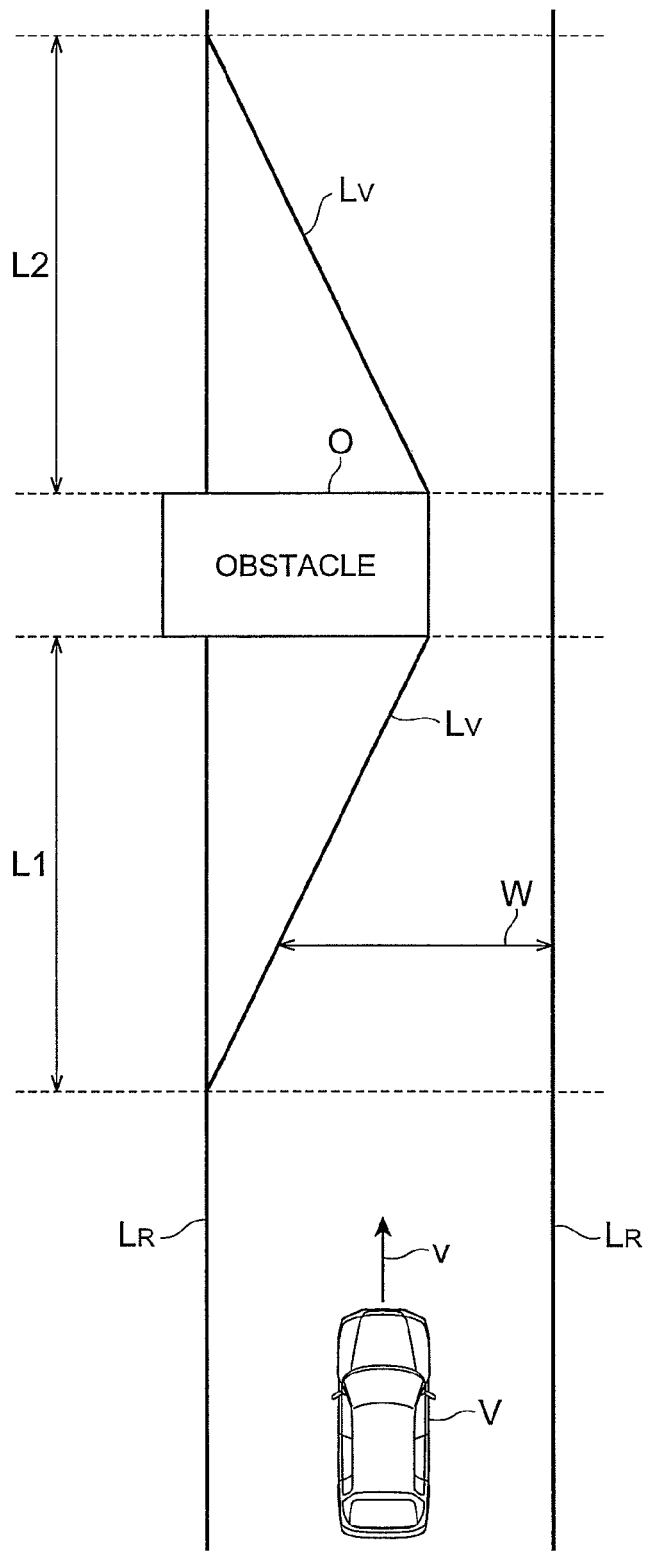
[FIG. 2]

(Operation in the situation where there is an obstacle in a front lane and there is no choice but to avoid the obstacle in one direction) Hereinafter, an operation of the travel supporting control system 10 of the present embodiment will be described. FIG. 2 is a plan view showing the situation of a road to which the travel supporting control system according to the embodiment is applied. In the following description, the case is assumed in which a vehicle V is traveling on the lane divided by a white line $L_R$ and an obstacle O, such as a parked vehicle, is located at one side of the lane.

Figure 3:
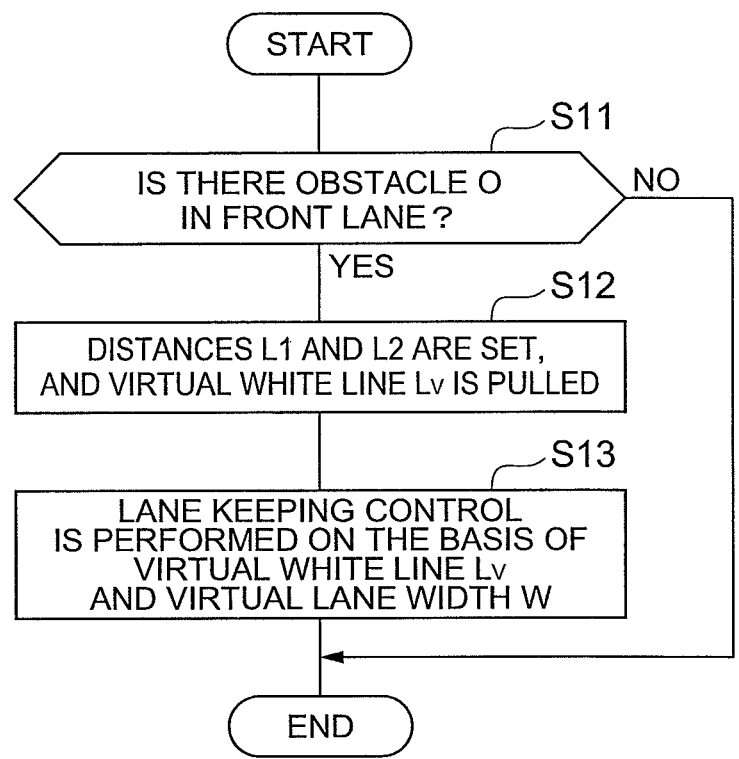
[FIG. 3]

FIG. 3 is a flow chart showing the overall operation of the travel supporting control system 10 according to the embodiment. As shown in FIG. 3, in the travel supporting control system 10 of the present embodiment, when the obstacle detecting sensor 11 detects that the obstacle O exists in the front lane (S11), the LDW/LKA system 17 sets a virtual lane, which is a region where the vehicle V travels in the lane narrowed by the obstacle O, by setting the distances L1 and L2 in FIG. 2 (S12). As shown in FIG. 2, the virtual lane is a region divided by the white line $L_R$ and a virtual white line $L_V$. Referring back to FIG. 3, the LDW/LKA system 17 performs lane keeping control by LDW or LKA on the basis of the virtual white line $L_V$ and the virtual lane width W which is the width of the virtual lane (S13).

Figure 4:
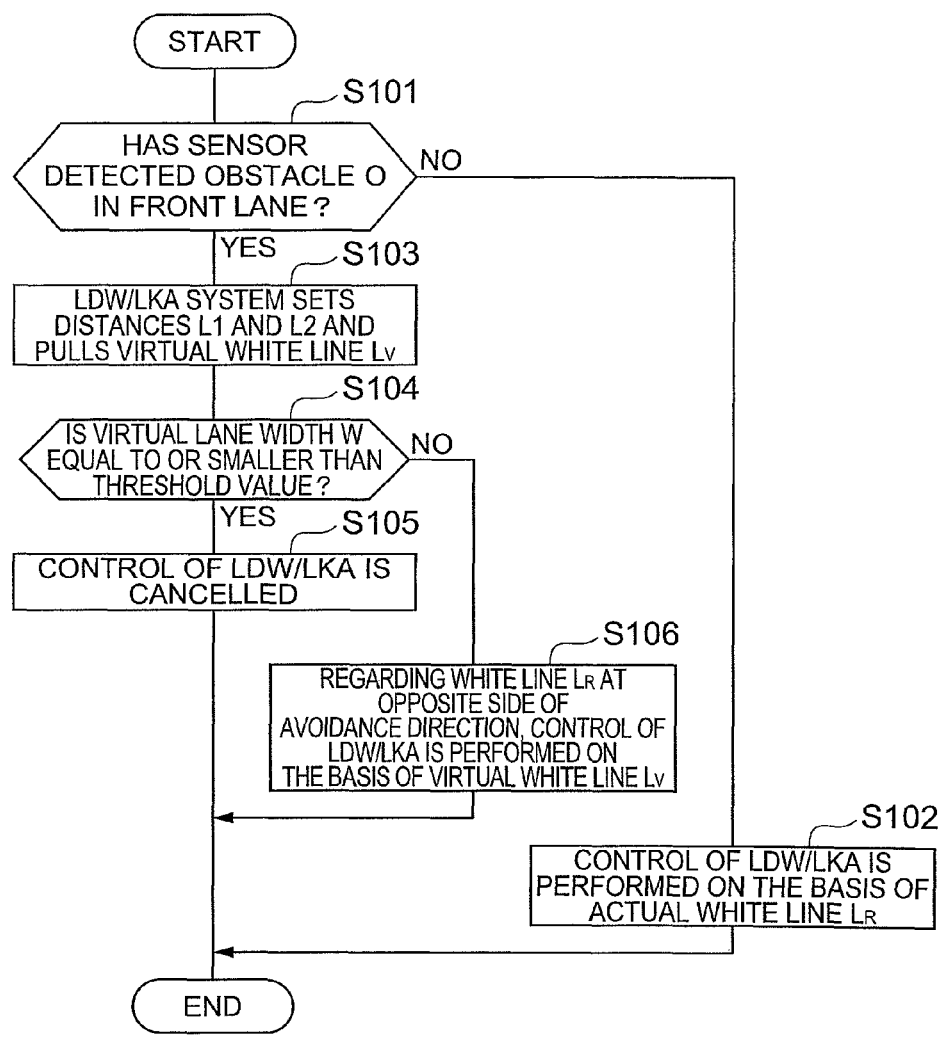
[FIG. 4]

FIG. 4 is a flow chart showing the details of the operation of the travel supporting control system according to the embodiment, which shows the operation in the situation where there is an obstacle in the front lane and there is no choice but to avoid the obstacle in one direction. When the obstacle detecting sensor 11 does not detect that the obstacle O exists in the front lane (S101), the LDW/LKA system 17 performs lane keeping control by LDW or LKA on the basis of the actual white line $L_R$ (S102).

When the obstacle detecting sensor 11 detects that the obstacle O exists in the front lane (S101), the LDW/LKA system 17 sets the distances L1 and L2 and pulls the virtual white line $L_V$. The distance L1 is calculated by L1=v×T. v is a vehicle speed of the vehicle V. T is a normal avoidance timing of a driver determined on the basis of a time TTC (time to collision) until the vehicle V and the obstacle O collide with each other when the vehicle V travels at the current vehicle speed v, and is normally a timing at which the driver starts the avoidance operation T seconds before collision. The distance L2 is set to L2=L1 or is set to a value smaller than the distance L1, for example, L2=L1/2.

Figure 7:
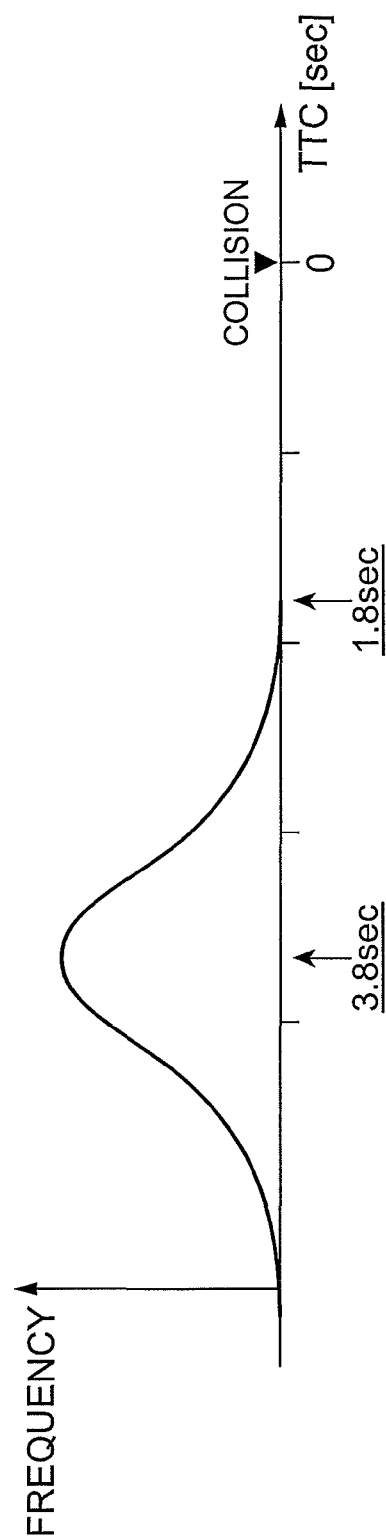
[FIG. 7]

Ideally, T which is a normal avoidance timing of a driver is set for every driver by learning the driving operation characteristic of each driver by the LDW/LKA system 17. However, when the LDW/LKA system 17 cannot learn the driving operation characteristic of each driver or when the driving operation characteristics have not been learned yet sufficiently, it may be set on the basis of the value calculated from the statistical data. FIG. 7 is a graph showing the distribution of timing of a normal avoidance operation of a driver against an obstacle. 3.8 seconds, which is the average value of a normal avoidance timing of a driver, or 1.8 seconds, which is a lower limit of the avoidance timing, may be used as an initial value of T which is the normal avoidance timing of the driver.

It is still better that the LDW/LKA system 17 changes the initial value of T, which is the normal avoidance timing of the driver, on the basis of the speed of an obstacle detected by the obstacle detecting sensor 11 and the vehicle speed sensor 12, the relative speed with respect to the obstacle, and the overlapping rate with the obstacle (rate at which the obstacle O overlaps the vehicle V in the lane width direction).

Figure 8:
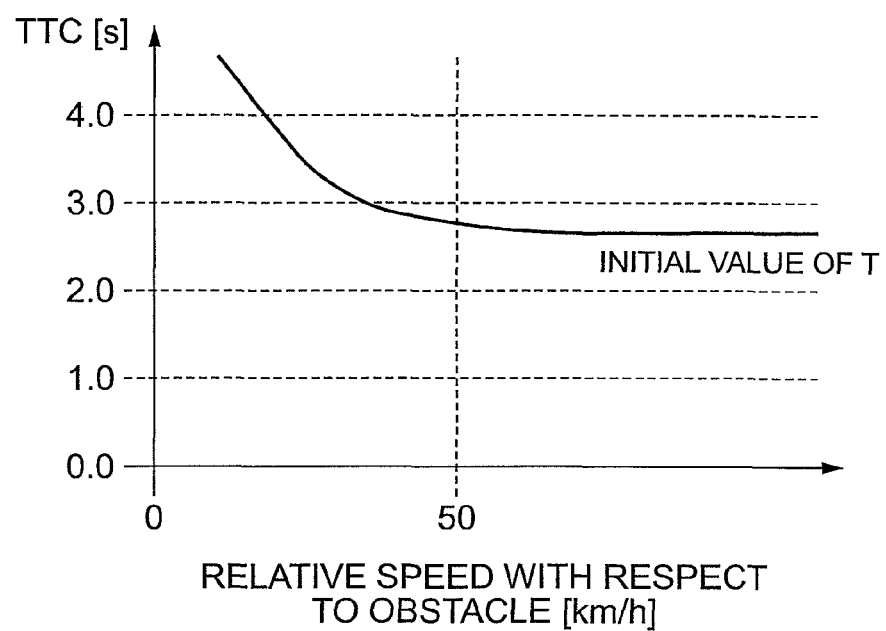
[FIG. 8]
Figure 9:
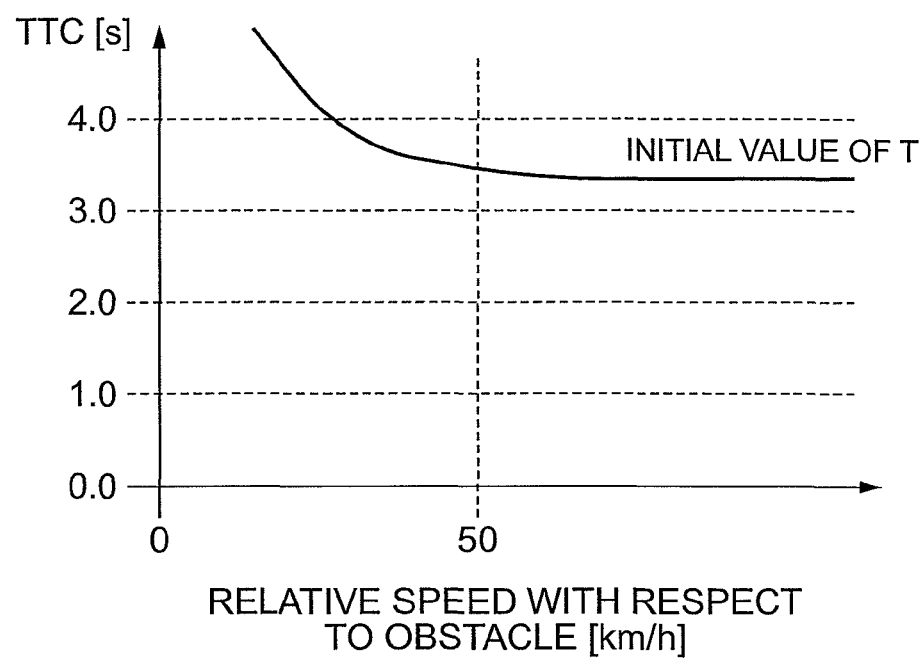
[FIG. 9]
Figure 10:
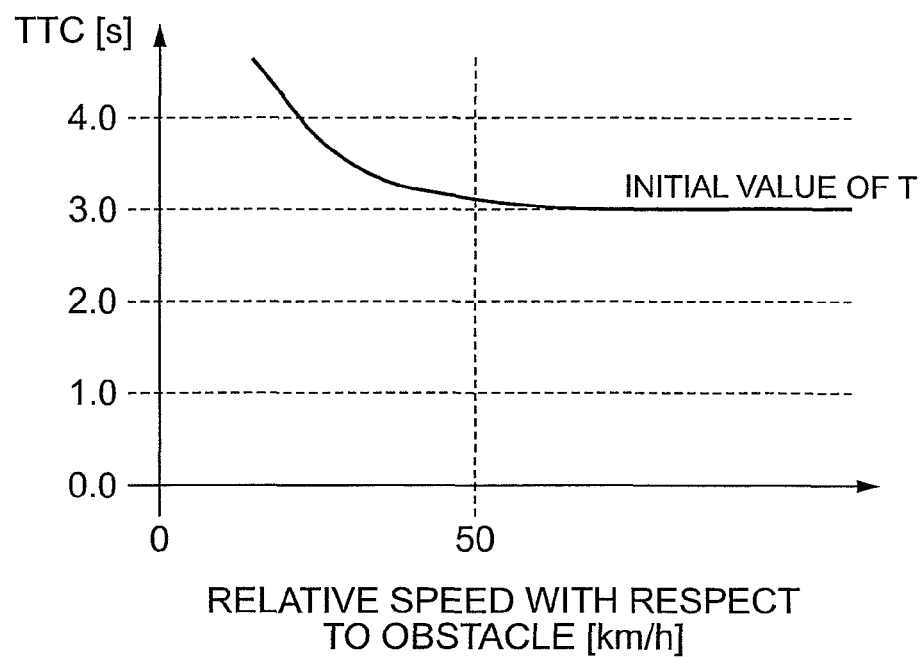
[FIG. 10]
Figure 11:
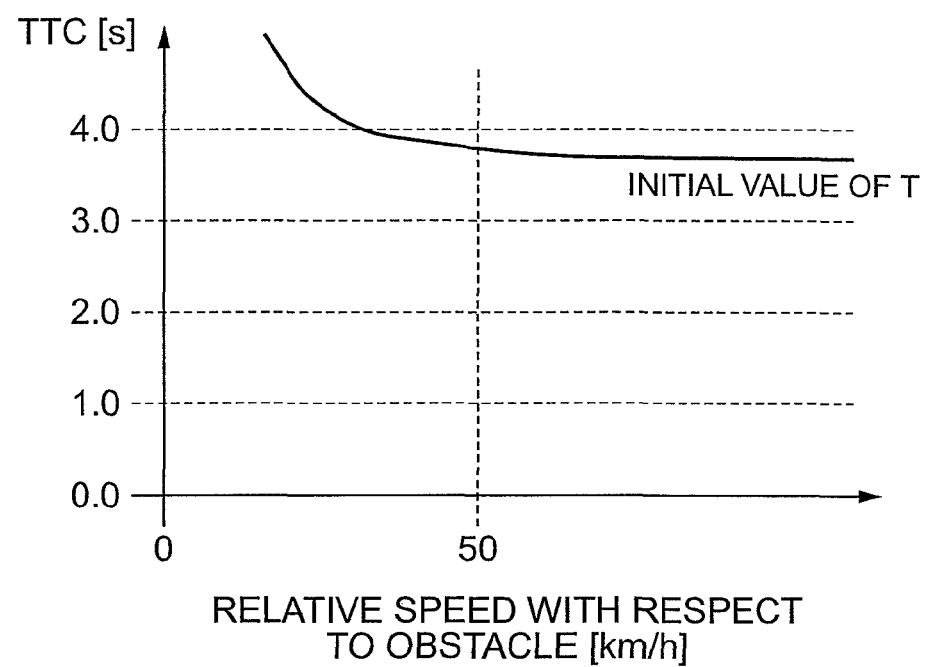
[FIG. 11]

FIG. 8 is a graph showing the relationship between the relative speed with respect to the obstacle O and T, which is a normal avoidance timing, when the overlapping rate is 50% in a state where the obstacle is stopped, FIG. 9 shows the case when the overlapping rate is 100% in a state where the obstacle O is stopped, FIG. 10 shows the case when the overlapping rate is 50% in a state where the speed of the obstacle O is 30 km/h, and FIG. 11 shows the case when the overlapping rate is 100% in a state where the speed of the obstacle O is 30 km/h.

As shown in FIGS. 8 to 11, the initial value of T which is the normal avoidance timing decreases as the relative speed with respect to the obstacle increases in all of the cases. The initial value of T in the case where the speed is 30 km/h is larger than the case where the obstacle O is in the stopped state. It is thought that the initial value of T tends to be larger when the overlapping rate is closer to 100%.

Figure 12:
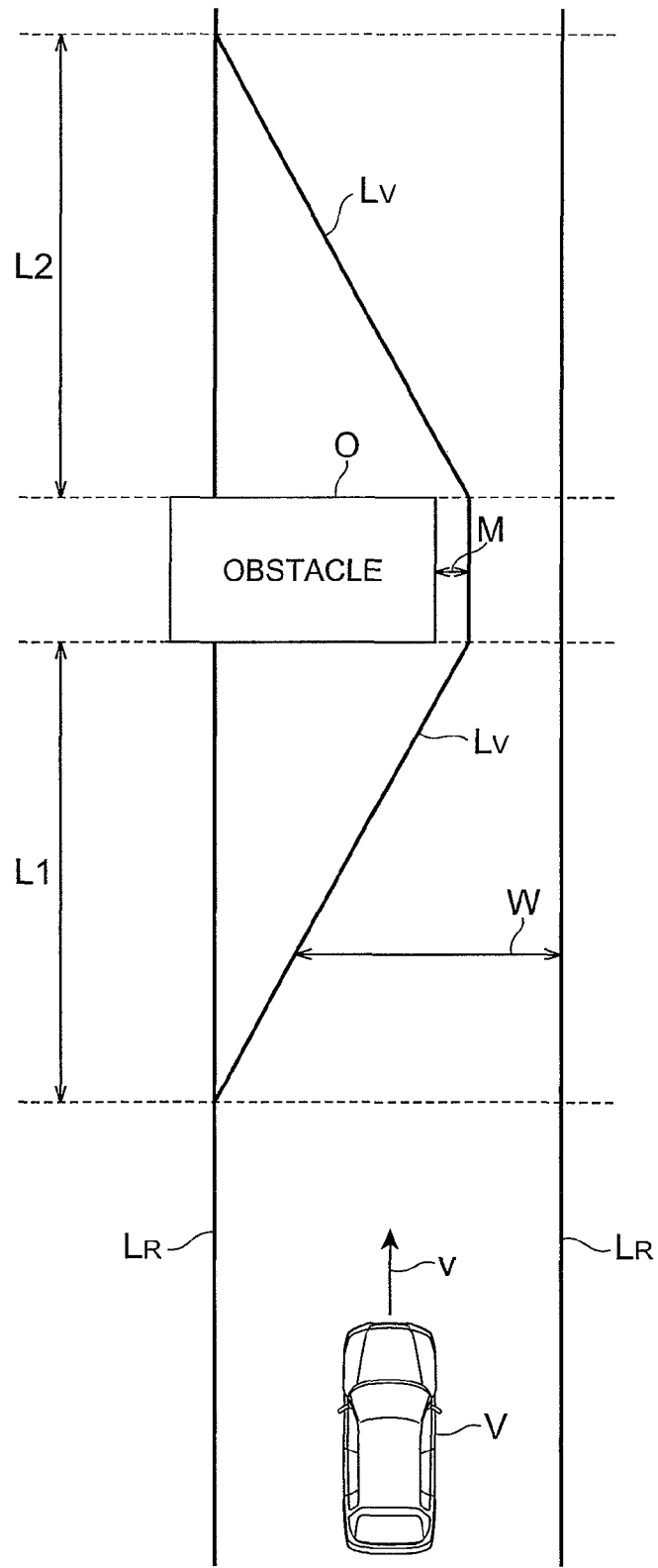
[FIG. 12]

In addition, the virtual white line $L_V$ may be set as a line other than the straight line described above. For example, it may be set as a clothoid curve. Alternatively, as shown in FIG. 12, the LDW/LKA system 17 may calculate the virtual lane width W by setting the safety margin M with a width of about 0.1 to 1.0 m at the side of the obstacle O and pulling the virtual white line $L_V$ on the basis of the safety margin M and the distances L1 and L2.

Referring back to FIG. 4, the LDW/LKA system 17 determines whether or not the virtual lane width W shown in FIG. 2 is equal to or smaller than a predetermined threshold value, for example, 3.5 m (S104). When the virtual lane width W is equal to or smaller than 3.5 m or less, the LDW/LKA system 17 stops the operation of LDW or LKA (S105).

Figure 5:
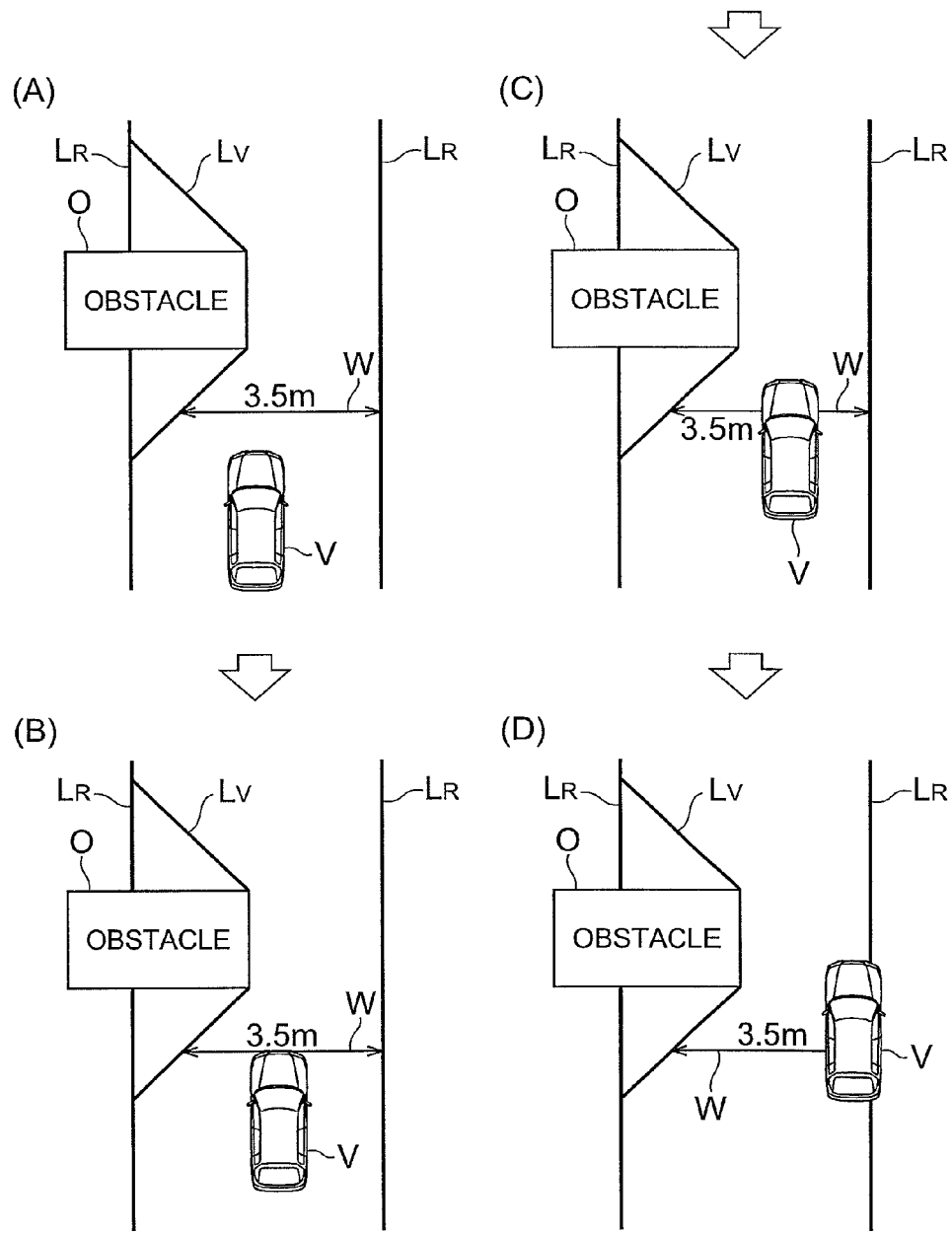
[FIG. 5]

FIGS. 5A to 5D are plan views showing an example when course changing is required for obstacle avoidance. As shown in FIGS. 5A and 5B, the LDW/LKA system 17 controls the operation of LDW or LKA on the basis of the virtual white line $L_V$ until the vehicle V arrives at the location where the virtual lane width W becomes equal to or smaller than 3.5 m in the virtual lane. The LDW/LKA system 17 guides the vehicle V to the right side while the control of LKA is being performed. As shown in FIG. 5C, when the vehicle V arrives at the location where the virtual lane width W becomes equal to or smaller than 3.5 m in the virtual lane, the LDW/LKA system 17 stops the operation of LDW and LKA. As shown in FIG. 5D, the vehicle V avoids the obstacle O by going over the white line $L_R$, which is a boundary of the lane, and deviating from the lane to perform course changing. However, since the LDW/LKA system 17 stopped the operation of LDW and LKA, a warning by the buzzer 18 or the steering torque for returning to the lane by the steering torque output device 20 is not generated even if the vehicle V deviates from the lane.

Referring back to FIG. 4, when the virtual lane width W is not equal to or smaller than 3.5 m which is a predetermined threshold value (S104), the LDW/LKA system 17 controls the operation of LDW or LKA on the basis of the virtual white line $L_V$ regarding the white line $L_R$ at the opposite side of the avoidance direction (at a side where the obstacle O is located in FIG. 4) (S106).

Figure 6:
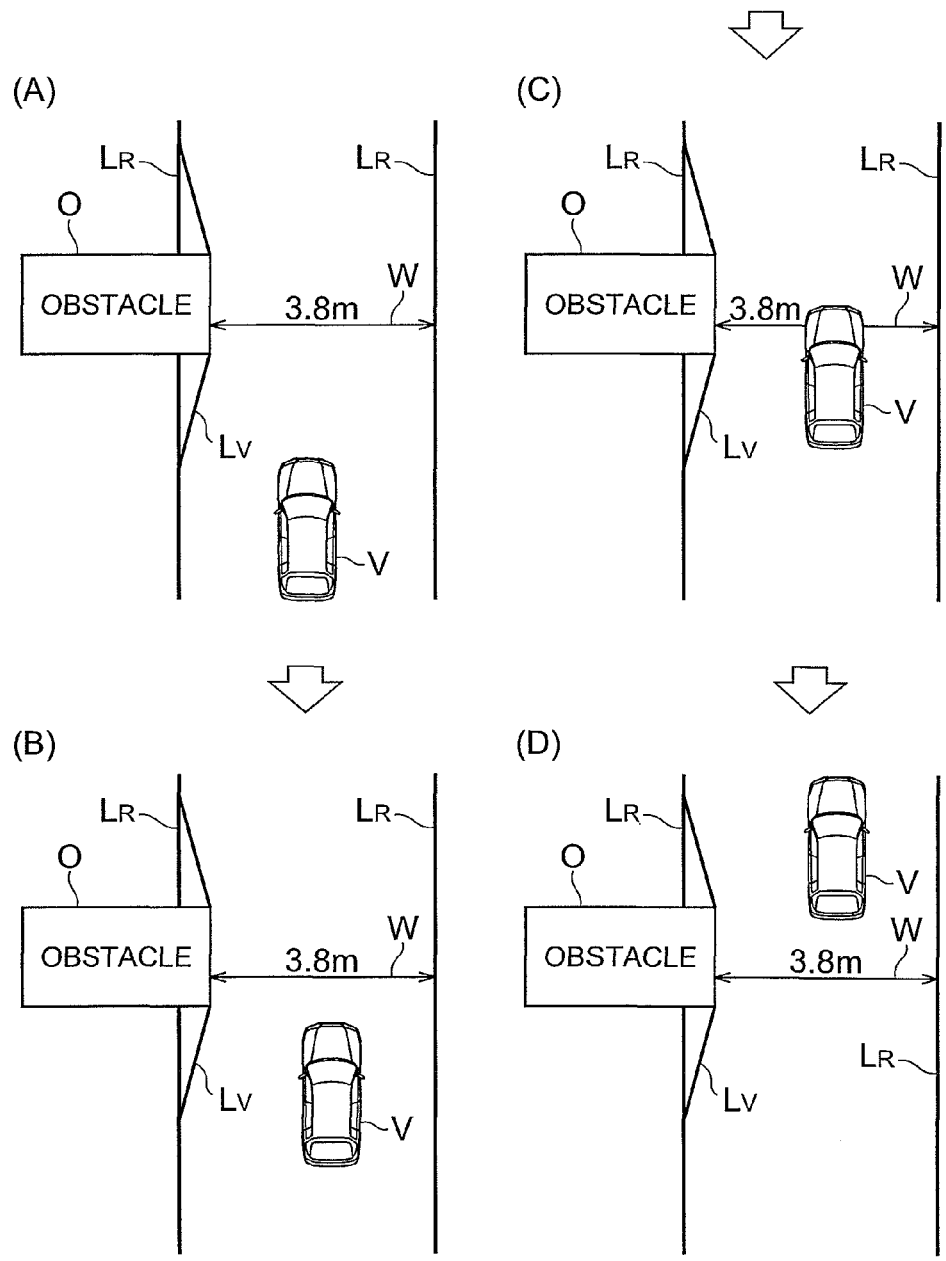
[FIG. 6]

FIGS. 6A to 6D are plan views showing an example when course changing is not necessary for obstacle avoidance. As shown in FIGS. 6A and 6B, the LDW/LKA system 17 controls the operation of LDW or LKA on the basis of the virtual white line $L_V$. The LDW/LKA system 17 guides the vehicle V to the right side while the control of LKA is being performed. As shown in FIGS. 5C and 5D, even if the vehicle V approaches the obstacle O, the LDW/LKA system 17 continues the operation of LDW or LKA on the basis of the virtual white line $L_V$ because the virtual lane width W in the virtual lane is larger than 3.5 m, which is a threshold value, so that the vehicle V can avoid the obstacle O without deviating from the lane.

(Operation in the Situation Where There is an Obstacle in a Front Lane and Avoidance to Either the Left Side or the Right Side is Possible)

Figure 13:
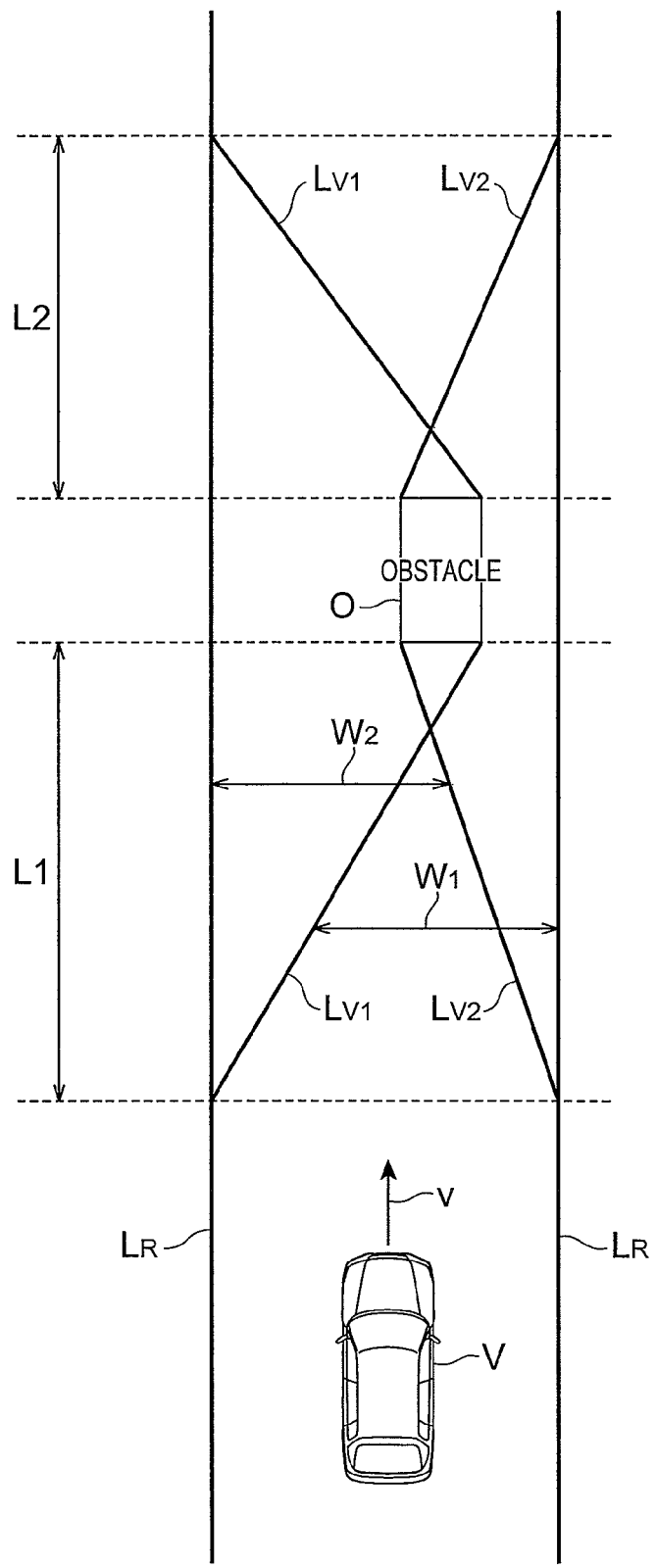
[FIG. 13]

FIG. 13 is a plan view showing the situation of a road to which the travel supporting control system according to the embodiment is applied. In the following description, the case is assumed in which the vehicle V is traveling on the lane divided by the white line $L_R$ and the obstacle O, such as a parked vehicle, is located in the middle of the lane. Also in this case, the overall operation is performed as shown in FIG. 3.

Figure 14:
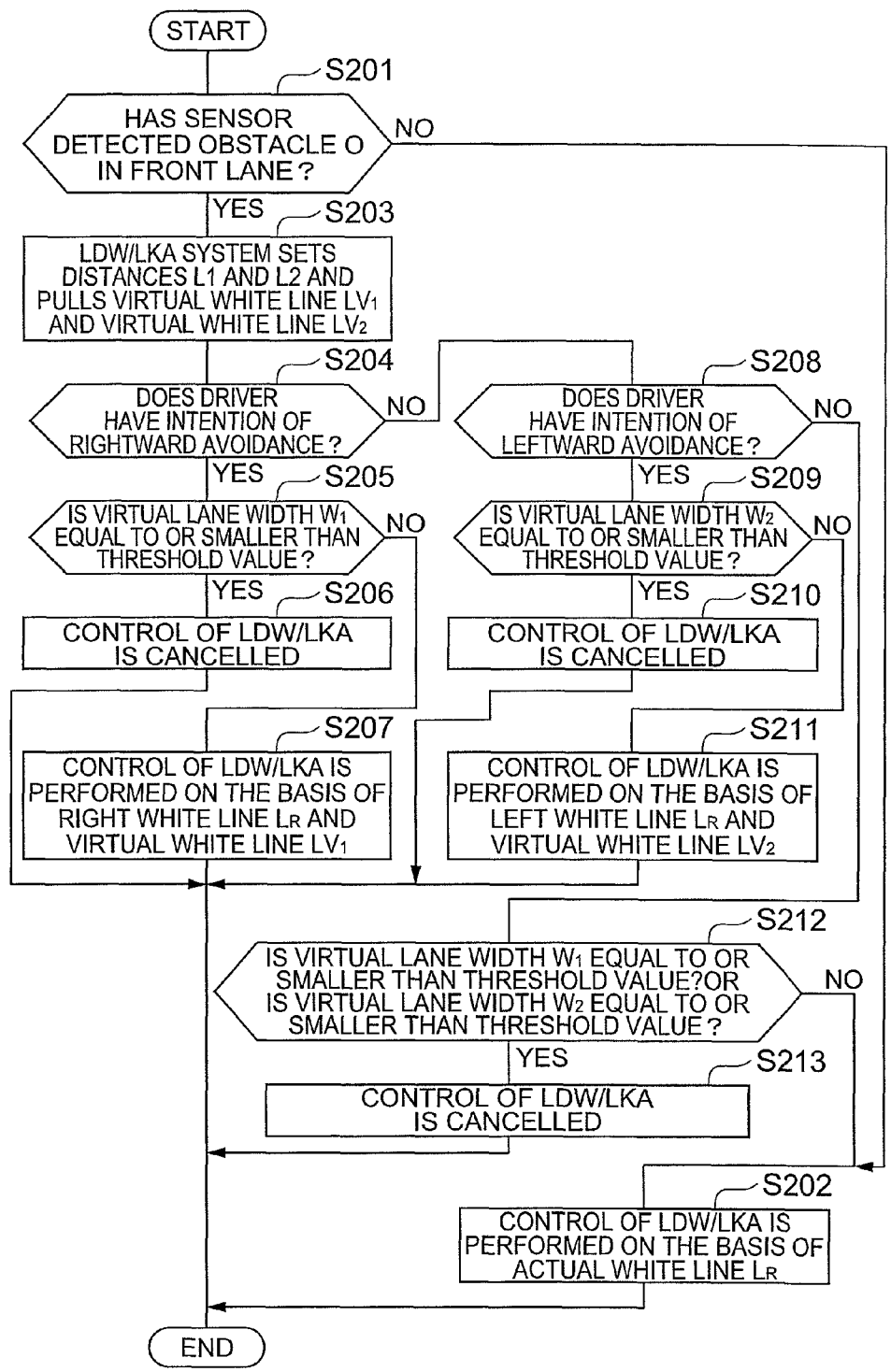
[FIG. 14]

FIG. 14 is a flow chart showing the details of the operation of the travel supporting control system 10 according to the embodiment, which shows the operation in the situation where the obstacle O exists in the front lane and avoidance to either the left side or the right side is possible. When the obstacle detecting sensor 11 does not detect that the obstacle O exists in the front lane (S201), the LDW/LKA system 17 performs lane keeping control by LDW or LKA on the basis of the actual white line $L_R$ (S202).

Figure 15:
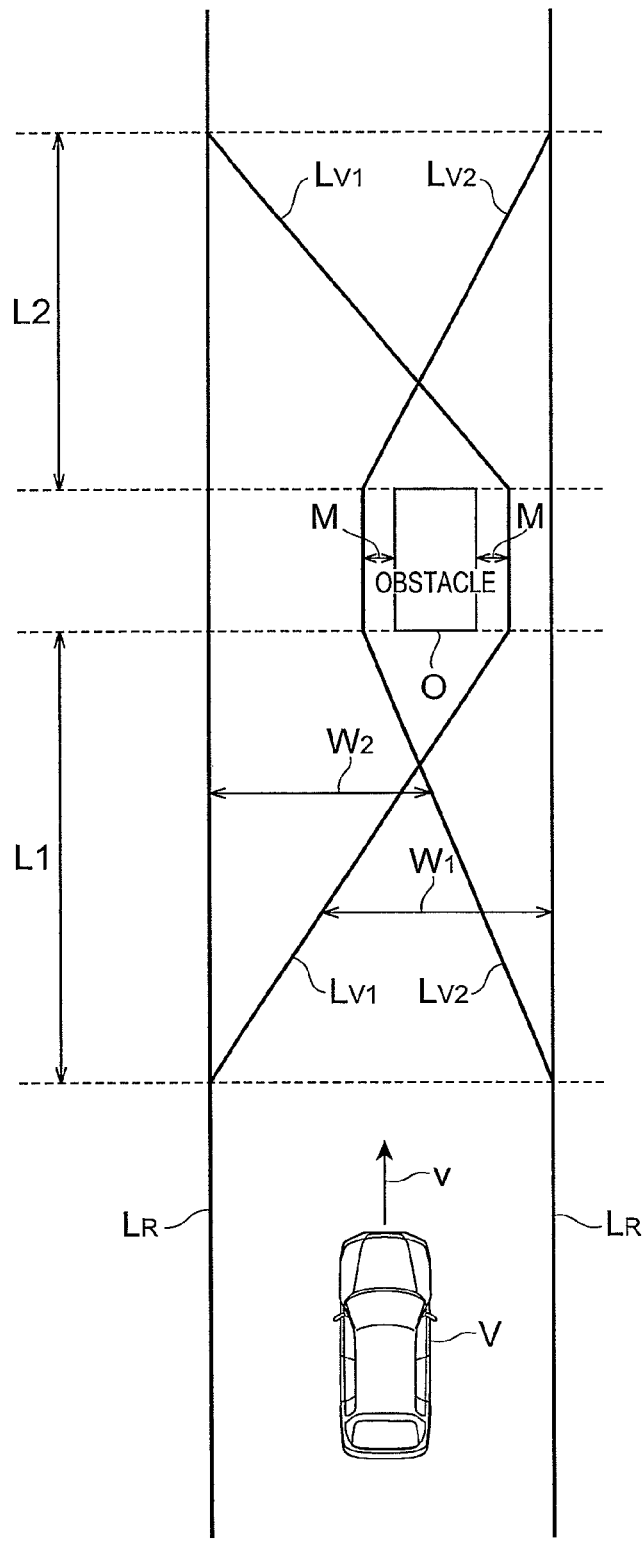
[FIG. 15]

When the obstacle detecting sensor 11 detects that the obstacle O exists in the front lane (S101), the LDW/LKA system 17 sets the distances L1 and L2 similarly to the operation in the situation where there is no choice but to avoid the obstacle in one direction and pulls virtual white lines $L_{V1}$ and $L_{V2}$, which divide the region where the vehicle V travels, to the left and right sides of the obstacle O. Also in this case, the virtual white line $L_V$ may be set as a line other than the straight line. For example, it may be set as a clothoid curve. Alternatively, as shown in FIG. 15, the LDW/LKA system 17 may calculate the virtual lane widths $W_1$ and $W_2$ by setting the safety margin M with a width of about 0.1 to 1.0 m at the left and right sides of the obstacle O and pulling the virtual white lines $L_{V1}$ and $L_{V2}$ on the basis of the safety margin M and the distances L1 and L2.

When the LDW/LKA system 17 determines that the driver has an intention to avoid the obstacle O to the right side by the steering torque detecting sensor 14 (S204), the LDW/LKA system 17 determines whether or not the virtual lane width $W_1$ on the right side of the obstacle O shown in FIG. 13 is equal to or smaller than a predetermined threshold value, for example, 3.5 m (S205). When the vehicle V arrives at the location where the virtual lane width $W_1$ becomes equal to or smaller than 3.5 m, the LDW/LKA system 17 stops the operation of LDW or LKA (S206). A determination regarding in which direction of the left and right directions the driver is going to avoid the obstacle O can be made on the basis of the steering in the early stage of avoidance of the driver, for example. On the other hand, when the virtual lane width $W_1$ is not equal to or smaller than 3.5 m which is a predetermined threshold value (S205), the LDW/LKA system 17 controls the operation of LDW or LKA on the basis of the white line $L_R$ on the right side and the virtual white line $LV_1$ on the right side of the obstacle O (S207).

When the LDW/LKA system 17 does not determine that the driver has an intention to avoid the obstacle O to the right side by the steering torque detecting sensor 14 (S204) but determines that the driver has an intention to avoid the obstacle O to the left side (S208), the LDW/LKA system 17 determines whether or not the virtual lane width $W_2$ on the left side of the obstacle O shown in FIG. 13 is equal to or smaller than a predetermined threshold value, for example, 3.5 m (S209). When the vehicle V arrives at the location where the virtual lane width $W_2$ becomes equal to or smaller than 3.5 m, the LDW/LKA system 17 stops the operation of LDW or LKA (S210). On the other hand, when the virtual lane width $W_2$ is not equal to or smaller than 3.5 m which is a predetermined threshold value (S209), the LDW/LKA system 17 controls the operation of LDW or LKA on the basis of the white line $L_R$ on the left side and the virtual white line $LV_2$ on the left side of the obstacle O (S211).

When the LDW/LKA system 17 does not determine that the driver has an intention to avoid the obstacle O to the right side by the steering torque detecting sensor 14 (S204) and does not determine that the driver has an intention to avoid the obstacle O to the left side (S208), the LDW/LKA system 17 stops the operation of LDW or LKA (S213) if the virtual lane width $W_1$ is equal to or smaller than 3.5 m which is a predetermined threshold value or if the virtual lane width $W_2$ is equal to or smaller than 3.5 m which is a predetermined threshold value (S212). In addition, the LDW/LKA system 17 determines whether to stop the operation of LDW or LKA on the basis of the virtual lane width $W_1$ of the region, which is divided by the virtual white line $L_{V1}$ and the white line $L_R$ on the right side, and the virtual lane width $W_2$ of the region, which is divided by the virtual white line $L_{V2}$ and the white line $L_R$ on the left side. However, before stopping the operation of LDW or LKA, the lane divided by the actual white line $L_R$ is set, for both the left and right sides, as a lane from which departure is to be prevented by LDW or LKA.

In this case, the LDW/LKA system 17 may set, as conditions of stopping the operation of LDW or LKA, the case where the virtual lane width $W_1$ is equal to or smaller than 3.5 m which is a predetermined threshold value or the virtual lane width $W_2$ is equal to or smaller than 3.5 m which is a predetermined threshold value in S212. Moreover, in this case, a point of time when the vehicle V arrives at the location where the distance from the obstacle O is a distance set as a predetermined threshold value, for example, the distance L1 may be set as a point of time when the LDW/LKA system 17 does not determine that the driver has an intention to avoid the obstacle O to the right side by the steering torque detecting sensor 14 (S204) and does not determine that the driver has an intention to avoid the obstacle O to the left side.

On the other hand, when the virtual lane width $W_1$ is not equal to or smaller than 3.5 m which is a predetermined threshold value or the virtual lane width $W_2$ is not equal to or smaller than 3.5 m which is a predetermined threshold value (S212), the LDW/LKA system 17 performs lane keeping control on the basis of the actual white line $L_R$ by LDW or LKA (S202).

In the present embodiment, in the travel supporting control system 10 including the LDW/LKA system 17 which performs traveling-lane keeping assist control so that the vehicle V travels without deviating from the lane along which it travels, the LDW/LKA system 17 calculates the virtual lane width W, which is the width of the lane narrowed by the obstacle O detected by the obstacle detecting sensor 11, and stops the traveling-lane keeping assist control when the calculated virtual lane width W is so narrow as to be equal to or smaller than a threshold value and the avoidance operation of the driver is required. Accordingly, since the operation of LDW or LKA can be stopped at a proper timing, it becomes possible to prevent interference between the operation of the driver and the operation of the system for keeping the lane.

Moreover, in the present embodiment, the LDW/LKA system 17 sets a virtual lane, which is a region where the vehicle V travels in the lane narrowed by the obstacle O detected by the obstacle detecting sensor 11, and calculates the width of the set virtual lane as the virtual lane width W. Accordingly, it is possible to stop the operation of LDW or LKA at an ideal timing according to the width of the region where the vehicle V travels.

Moreover, in the present embodiment, the LDW/LKA system 17 stops the operation of LDW or LKA when the virtual lane width $W_1$ or the virtual lane width $W_2$ of the virtual lane in a direction in which the driver is going to make the vehicle travel, which is assumed on the basis of the steering torque detected by the steering torque detecting sensor 14, among the plurality of divided virtual lanes is equal to or smaller than the threshold value. Accordingly, even when a lane which stops the operation of LDW or LKA and a lane which does not stop the operation of LDW or LKA are mixed on the road, it becomes possible to prevent interference between the operation of the driver and the operation of the system for keeping the lane.

Moreover, in the present embodiment, traveling-lane keeping assist control is performed so that the vehicle V travels without deviating from the virtual lane until the vehicle V arrives at the location where the virtual lane width W becomes equal to or smaller than the threshold value in the virtual lane, and the traveling-lane keeping assist control is stopped when the vehicle V arrives at the location where the virtual lane width W becomes equal to or smaller than the threshold value in the virtual lane. Accordingly, even in a virtual lane narrowed by the obstacle O, it is possible to operate LDW or LKA until the midway and stop the operation of LDW or LKA at a proper timing.

In addition, according to the present embodiment, if a driver does not determine the direction in which the driver is going to make the vehicle travel, the traveling-lane keeping assist control is stopped when one of the plurality of divided virtual lanes becomes equal to or smaller than a threshold value. Accordingly, when a driver's intention is not determined, the traveling-lane keeping assist control is stopped early. As a result, it becomes possible to prevent interference between the operation of the driver and the operation of the system for keeping the lane when the driver's intention is determined.

In addition, it is needless to say that the present invention is not limited to the above-described embodiment and various changes may be made without departing from the spirit or scope of the present invention.

INDUSTRIAL APPLICABILITY

The present invention can provide a travel supporting control system capable of preventing interference between the operation of a driver and the operation of a system for keeping the lane.

REFERENCE SIGNS LIST

10: travel supporting control system
11: obstacle detecting sensor
12: vehicle speed sensor
13: white line recognizing sensor
14: steering torque detecting sensor
15: lane keeping system ON/OFF switch
16: PCS system
17: LDW/LKA system
18: buzzer
19: indicator
20: steering torque output device

The invention claimed is:

1. A travel supporting control system comprising:
a traveling-lane keeping assist control unit that performs traveling-lane keeping assist control, which is either assistance of driving of a driver of a vehicle or control of traveling of the vehicle, so that the vehicle travels without deviating from a lane along which the vehicle travels;
an obstacle detecting unit that detects an obstacle in front of the vehicle;
a virtual lane setting unit that sets a virtual lane which is a region where the vehicle travels in the lane narrowed by the obstacle detected by the obstacle detecting unit;
a virtual lane width calculating unit that calculates a virtual lane width which is a width of the virtual lane set by the virtual lane setting unit;
a traveling-lane keeping assist control stopping unit that stops the traveling-lane keeping assist control performed by the traveling-lane keeping assist control unit when the virtual lane width calculated by the virtual lane width calculating unit is equal to or smaller than a threshold value and before the driver performs a driving operation of causing the vehicle to avoid the obstacle by going over the virtual lane;
a driver intention detecting unit capable of detecting a direction, in which the driver is going to make the vehicle travel, on the basis of an operation of the driver of the vehicle; and
a virtual lane selecting unit that when the virtual lane setting unit sets a plurality of virtual lanes divided in the width direction of the virtual lane by the obstacle detected by the obstacle detecting unit, selects the virtual lane in the direction in which the driver is going to make the vehicle travel, which is detected by the driver intention detecting unit, from the plurality of divided virtual lanes,
wherein the traveling-lane keeping assist control stopping unit stops the traveling-lane keeping assist control performed by the traveling-lane keeping assist control unit when the virtual lane width of the virtual lane selected by the virtual lane selecting unit is equal to or smaller than the threshold value.

2. The travel supporting control system according to claim 1,
wherein the traveling-lane keeping assist control unit performs the traveling-lane keeping assist control so that the vehicle travels without deviating from the virtual lane until the vehicle arrives at the location where the virtual lane width becomes equal to or smaller than the threshold value in the virtual lane, and
the traveling-lane keeping assist control stopping unit stops the traveling-lane keeping assist control performed by the traveling-lane keeping assist control unit when the vehicle arrives at the location where the virtual lane width becomes equal to or smaller than the threshold value in the virtual lane.

3. The travel supporting control system according to claim 1, wherein when the driver intention detecting unit does not detect a direction in which the driver is going to make the vehicle travel, the traveling-lane keeping assist control stopping unit stops the traveling-lane keeping assist control performed by the traveling-lane keeping assist control unit when one of the plurality of divided virtual lanes is equal to or smaller than the threshold value.

4. A travel supporting control system comprising:
a traveling-lane keeping assist control unit that performs traveling-lane keeping assist control, which is either assistance of driving of a driver of a vehicle or control of traveling of the vehicle, so that the vehicle travels without deviating from a lane along which the vehicle travels;
an obstacle detecting unit that detects an obstacle in front of the vehicle;
a virtual lane setting unit that sets a virtual lane which is a region where the vehicle travels in the lane narrowed by the obstacle detected by the obstacle detecting unit;
a virtual lane width calculating unit that calculates a virtual lane width which is a width of the virtual lane set by the virtual lane setting unit; and
a traveling-lane keeping assist control stopping unit that stops the traveling-lane keeping assist control performed by the traveling-lane keeping assist control unit when the virtual lane width calculated by the virtual lane width calculating unit is equal to or smaller than a threshold value and before the driver performs a driving operation of causing the vehicle to avoid the obstacle by going over the virtual lane,
wherein the traveling-lane keeping assist control unit performs the traveling-lane keeping assist control so that the vehicle travels without deviating from the virtual lane until the vehicle arrives at the location where the virtual lane width becomes equal to or smaller than the threshold value in the virtual lane, and
the traveling-lane keeping assist control stopping unit stops the traveling-lane keeping assist control performed by the traveling-lane keeping assist control unit when the vehicle arrives at the location where the virtual lane width becomes equal to or smaller than the threshold value in the virtual lane.

5. A travel supporting control system comprising:
a traveling-lane keeping assist control unit that performs traveling-lane keeping assist control, which is either assistance of driving of a driver of a vehicle or control of traveling of the vehicle, so that the vehicle travels without deviating from a lane along which the vehicle travels;
an obstacle detecting unit that detects an obstacle in front of the vehicle;
a virtual lane setting unit that sets a virtual lane which is a region where the vehicle travels in the lane narrowed by the obstacle detected by the obstacle detecting unit;
a virtual lane width calculating unit that calculates a virtual lane width which is a width of the virtual lane set by the virtual lane setting unit; and a traveling-lane keeping assist control stopping unit that stops the traveling-lane keeping assist control performed by the traveling-lane keeping assist control unit when the virtual lane width calculated by the virtual lane width calculating unit is equal to or smaller than a threshold value and before the driver performs a driving operation of causing the vehicle to avoid the obstacle by going over the virtual lane, wherein the virtual lane setting unit sets the virtual lane starting from a predetermined position where the driver of the vehicle usually starts avoidance against the obstacle.

* * * * *